United States Patent [19]

Kleyn

[11] 4,299,853

[45] Nov. 10, 1981

[54] BIOLOGICAL PRESERVATION OF BEER

[75] Inventor: John G. Kleyn, Seattle, Wash.

[73] Assignee: Ben Schoorlemmer, a part interest

[21] Appl. No.: 703,274

[22] Filed: Jul. 7, 1976

Related U.S. Application Data

[63] Continuation of Ser. No. 344,973, Mar. 26, 1973, abandoned, which is a continuation of Ser. No. 117,068, Feb. 18, 1971, abandoned.

[51] Int. Cl.$^3$ .......................... C12H 1/14; C12K 1/04
[52] U.S. Cl. ..................................... 426/271; 426/232; 426/330.4; 435/34
[58] Field of Search ................. 426/11, 15, 16, 330.4, 426/271, 231, 339, 232; 435/34

[56] References Cited

U.S. PATENT DOCUMENTS

| | | | |
|---|---|---|---|
| 2,711,963 | 6/1955 | Gray | 426/330.4 X |
| 2,748,002 | 5/1956 | Kneen | 426/330.4 X |
| 2,846,317 | 8/1958 | Bersworth et al. | 426/271 |

OTHER PUBLICATIONS

Kleyn et al., *Saccharomyces diastaticus* and the Biological Stability of Non-pasteurized Bottle Beer, Wallerstein Laboratories Communications, vol. XXVIII, No. 95, 1965 (pp. 35-47).
DeClerck, J., A Textbook of Brewing, vol. 1, Chapman and Hall, Ltd. London, 1957 (pp. 514-520).

*Primary Examiner*—David M. Naff
*Attorney, Agent, or Firm*—Everett A. Johnson

[57] ABSTRACT

Light alcoholic beverages, such as beer, wine, and cider, produced by fermentation and subject to biological instability on storage due primarily to wild yeasts, particularly *Saccharomyces diastaticus* types, are preserved by the addition of EDTA to the fermented product prior to packaging. The EDTA additive includes ethylene diamine tetra acetic acid and the water soluble sodium, potassium, and calcium salts thereof, for example the disodium calcium salt. The amount of the EDTA preservative added is correlated with the ascertained wild yeast cell population of the untreated beverage.

6 Claims, No Drawings

BIOLOGICAL PRESERVATION OF BEER

RELATED PATENT APPLICATION

This application is a continuation of my copending application Ser. No. 344,973, filed Mar. 26, 1973, now abandoned, which is a continuation of my application Ser. No. 117,068, filed Feb. 18, 1971, and now abandoned.

The American brewing industry has evidenced considerable interest in packaging non-pasteurized beer in containers smaller than those conventionally used for draft beer—namely bottles and cans, thereby providing the consumer with a draft beer for home consumption. With this development in beer marketing there have been certain technological problems, one being that of biological stability after packaging.

A primary object of this invention is to provide a chemical method for biologically preserving finished beer which is as effective as pasteurization but neither as costly nor as time consuming as pasteurization.

I have discovered that by treating beer with EDTA as herein described, biological preservation of beer can be achieved. The theoretical factors involved in the described biological stabilization of package beer have been determined, and I have observed that spoilage by the action of wild yeasts includes fermentation of residual sugars that are not normally fermentable by brewers' yeasts, and that an increase in cell population takes place in the presence of trace metals, such as magnesium, but does not when the trace metals have been removed, as by ion exchange.

In accordance with my invention, a non-pasteurized, fully attenuated beer (i.e., a beer which is substantially free of residual fermentable extract or sugars) is biologically stabilized by determining the *S. diastaticus* cell population (typically between about 30 and 220 cells) per 12 oz. of process beer ready for packaging. The production beer is maintained at a temperature of about 32° F. for a finite time before treatment with between about 10 and 200 ppm of EDTA. The wild yeast inhibitor is introduced into the beer as an aqueous solution in amount sufficient to biologically stabilize the beer.

The amount of EDTA introduced is correlated with the initial cell population of the process beer; and the added stabilizer is sufficient to inhibit growth of *S. diastaticus* cell population of the beer to below about 5 to 20 cells per 12 oz. of package beer after a subsequent commercial shelf life of 2 to 3 months, and possibly for as long as 6 to 12 months.

The biological stabilizer EDTA is ethylenediamine tetraacetic acid and the water soluble alkali and alkaline earth metal salts thereof, particularly the calcium disodium salt.

The mode of action of microbial growth inhibition by FDTA and its salts probably relates to binding (chelation) of certain trace metals required for enzyme action within the living microorganism. Without such enzyme action further reproduction, and hence cell population growth, is inhibited and the beer is rendered biologically stable.

The microorganisms most commonly responsible for the biological spoilage of non-pasteurized beer have been identified as wild yeasts, a major one being *S. diastaticus*, having as one characteristic the ability to utilize certain of the residual, normally non-fermentable, sugars remaining in the finished beer (Kleyn et al, Wellerstein Laboratories Communications, Vol. XXVIII, No. 95, April 1965). Beer spoilage following their growth is characterized by a white sediment on the bottom of the bottle, sometimes extending up the bottle sides. The beer itself has a decidedly winey flavor because of the secondary fermentation.

The *S. carlsbergensis* strain of brewers yeast used for production of our beer was incapable of further growth in packaged beer. However, in our brewery such microorganisms as *S. diastaticus* were present in the process beer during the packaging phase, i.e., after the fermentation through final filtration steps.

Of the bacteria evaluated only one, a beer spoilage Lactobacillus sp. was able to grow in packaged beer.

An initial study showed that growth of the beer spoilage microorganisms studied was inhibited in package beer containing 10 to 100 ppm of the calcium disodium salt of EDTA. The Lactobacillus sp. was the least resistant as evidenced by growth inhibition at an EDTA salt level of 10 ppm. Whereas *S. diastaticus* was the most resistant and required an EDTA salt level of 100 ppm for growth inhibition.

In determining the preservative effect of calcium disodium EDTA against *S. diastaticus* and Lactobacillus sp. as the package spoilage microorganisms, lager beer in bottles was inoculated with 7 day 25° C. lager wort cultures at approximately 4000 cells per 11 oz. stubby and stored for 1 month at 25° C. These levels of spoilage microorganisms are 20 times the ascertained average concentration of *S. diastaticus* observed in extensive in plant monitoring.

The amount of EDTA salt required to retard biological spoilage of commercial non-pasteurized package beer is illustrated by the two following examples:

Commercial Lager Beer

Non-pasteurized lager beer as conventionally produced (without the benefit of bottle filler sterilization or packaging center air purification) was biologically stable for 3 months at a calcium disodium EDTA salt level of 200 ppm. At the next lower level evaluated, 150 ppm, seven of eight samples were biologically stable. All eight control samples were found to be infected.

Comercial Ale

Non-pasteurized ale as conventionally produced was biologically stable for 3 months at a calcium disodium EDTA salt level of 150 ppm. At the next lower level evaluated, 100 ppm, eleven out of twelve samples were biologically stable after 3 months. Eleven out of twelve control samples were found to be infected.

In making the above in-plant tests, the calcium disodium EDTA (6.5% stock solution in distilled water) was added at the reported levels to empty returnable bottles collected from the outlet of the bottle washer. In the case of the lager beer, 8 samples were prepared for each EDTA salt level. For the ale samples, the same procedure was followed but 12 samples were prepared for each level of EDTA salt.

Following preparation and identification, the bottles were placed on the bottle conveyor and fed through a 60 and 50 spout, respectively, beer filler and crowner. The filled bottles were collected from the outlet side of the filler and stored at room temperature (18°-27° C.) for three months. The number of infected and non-infected bottles after the 3 months storage at room temperature were identified with the results noted above.

To demonstrate that other package beer brands are rendered biologically stable in the presence of the calcium disodium salt of EDTA, pasteurized samples were inoculated with 600 cells per bottle, the inoculum being a 72 hr. 25° C. lager wort culture of S. diastaticus. This study included two national shippers' beers A and B, and four regional beers C, D, E, and F. The amount of EDTA salt required for preservation of these inoculated samples varied from 200 ppm for brand A and 100 ppm for brand B in attaining biological stability for extended periods of 2 to 3 months at room temperature. The amount required for brands C, D, E, and F fell between these limits.

Inasmuch as the inoculum was added to pasteurized samples of unknown process history, the variation in effectiveness may be due to residual metal ions in certain brands initially present in an amount sufficient to sequester a portion of the available EDTA and raise the apparent level of biological stabilizer required.

Control studies showed that growth inhibition by EDTA (100 ppm) was correlated directly with the S. diastaticus concentration. After 3 months storage, biological spoilage was evident at a concentration of 620 cells per bottle; and biological spoilage was evident after a 2 month period of incubation when the concentration of S. diastaticus was increased from 620 to 6,200 cells per bottle. Whereas, at the 100 ppm level biological spoilage occurred after only one month period of incubation at room temperature when the concentration of S. diastaticus was increased from 6200 to 62,000 cells per bottle of beer.

Our findings have shown that non-pasteurized package beer as commerically produced contained an average of about 220 yeast cells per bottle with a range of as low as 13 to a high of about 18,000 cells per bottle. A reduced yeast population (average of 30 cells per stubby with a range of 0 to 260 cells per stubby) of the process beer was observed prior to passage through the filler and crowner. Accordingly, the microbial population of non-pasteurized bottle beer can be reduced to a considerably lower level by proper sterilization of the filler and crowner, as well as sterile filtration of the packaging center air.

Thus the lower average wild yeast cell population of the order of 30 to 220 cells per 12 oz. of beer, the amount of EDTA salt used to retard biological spoilage for 3 months or more can be less than indicated by the observed cell populations. In any event, the cell population levels can be monitored and the amount of inhibitor selected to correlate with the cell population.

In accordance with my invention a non-pasteurized, fully attenuated beer, i.e., beer which is substantially free of residual fermentable sugars or extract but contains residual, normally non-fermentable sugar is biologically stabilized by the steps of determining the S. diastaticus cell population of the production beer prior to packaging; maintaining the production beer at a temperature of about 32° F. for a finite time; introducing an aqueous solution of EDTA into the production beer at about said maintained temperature and in amount sufficient to biologically stabilize the beer, and thereafter packaging the biologically stable beer; said introduced amount of EDTA being correlated with the determined cell population S. diastaticus in the production beer and in amount sufficient to inhibit growth of S. diastaticus to a cell population not in excess of about 5 to 20 cells per 12 oz. of package beer during a shelf life of at least 2 to 3 months.

The step of ascertaining the wild yeast cell population of the production beer may be effected by treating a beer sample with an agent such as fuschin-sulfite (Nakagawa, Bull.Brew.Sci (Japan) 14, 7/1968) which inhibits the growth of the brewers yeast such as S. calbergensis while permitting the growth of wild yeasts, including S. diastaticus to develop readily in the presence of dextrin added to the production beer sample. The extent of the wild yeast colonies can be determined, as by a microfilter, for correlation in selecting the amount of EDTA to be added to the production beer as the biological stabilizer.

Other techniques for ascertaining and monitoring the wild yeast population on a continuous or semi-continuous basis are contemplated. For example, the wild yeast cell population can be physically and rapidly determined by use of a micro-filter on a sidestream of the production beer, with or without the Nakagawa treatment.

Inasmuch as the wild yeasts feed on the residual sugars not normally fermentable by the brewers yeast, it is also contemplated that the presence of such residuals can be monitored in a continuous or semi-continuous manner utilizing identification techniques known to the industry. Likewise known concentrations of residual sugars can be established in the test samples to feed the suspected wild yeasts thereby standardizing the monitoring of the wild yeast population to be biologically stabilized.

Flavor evaluation studies have shown that calcium disodium EDTA or disodium EDTA levels up to 200 ppm had no noticeable effect on beer (lager or ale) flavor (odor or taste).

The preferred point of preservative addition is after final filtration and before packaging. Thus the monitoring of the wild yeast cell population should be made here. Preservative addition prior to final filtration could encounter possible increased metal ion concentrations (which normally are reduced in filtration) as well as a possible inhibiting effect on normal brewers yeast reproduction if added, e.g., before or during the fermentation phase of the operation.

It is also contemplated that the system in accordance with this invention employing EDTA as a biological stabilizer or preservative for beer may include either flash pasteurization before filling or tunnel pasteurization after filling. The EDTA treatment in accordance with this invention permits the use of lower pasteurization temperatures and/or shorter times for the production of so-called non-pasteurized package beer. In addition, aseptic filling is less of a sanitation problem and lesser amounts of EDTA can be effective for the desired biological preservative of the package beer.

Although the invention has been described with reference to bottle beer, it may be applied to other fermentation beverages and may be applied to beverages which are packaged in ways other than in bottles, e.g., in cans.

It is also contemplated that the alkali metal and alkaline earth metal salts may be used in combination or individually as described. Also means can be provided for the progressive release of the EDTA salt during storage.

What I claim is:

1. The method of biologically preserving a non-pasteurized, fully attenuated beer, i.e., beer which is substantially free of residual fermentable sugars and contains residual sugars normally sustaining the growth of wild yeasts, thereby forming sediment on storage, the steps which include determining the *S. diastaticus* cell population of the production beer prior to packaging; maintaining the production beer at a temperature of about 32° F. for a finite time; introducing an aqueous solution including EDTA into the production beer at about said maintained temperature and in amount sufficient to biologically stabilize the beer; and thereafter packaging the biologically stabilized beer; said introduced amount of EDTA being correlated with the cell population of *S. diastaticus* in the production beer and in amount sufficient to inhibit growth of *S. diastaticus*, thereby inhibiting sediment due to wild yeast growth in package beer during a shelf life of at least 2 to 3 months.

2. In the method of biologically preserving beer as in claim 1 containing residual sugars wherein the introduced EDTA comprises a compound selected from the class consisting of EDTA and its non-toxic alkali and alkaline earth metal salts.

3. The process of claim 2 which comprises introducing said microbiological growth inhibiting amount of EDTA to establish a yeast growth inhibiting content of from about 12 to 75 ppm in the package beer.

4. The method in accordance with claim 1 in which the biological stabilizing compound is selected from the group consisting of disodium calcium ethylenediaminetetraacetic acid, sodium calcium monoethanolethylene diaminetetraacetic acid and calcium diethanolethylenediacetic acid.

5. The method as in claim 1 of biologically preserving non-pasteurized package beer containing residual sugars supporting growth of wild yeasts during storage comprising the step of introducing into said beer, immediately prior to packaging, an aqueous solution containing a substantially neutral water soluble compound selected from the class consisting of EDTA and its sodium, potassium, and calcium salts.

6. The method in accordance with claim 1 wherein from about 10 to 200 ppm of EDTA yeast inhibiting compound is dissolved in the production beer as the biological preservation compound.

* * * * *